J. B. BARNES.
VEHICLE WHEEL TIRE.
APPLICATION FILED FEB. 1, 1911.

998,668.

Patented July 25, 1911.

WITNESSES

INVENTOR
Joshua B. Barnes
By Edward W. Furrell
His Atty

UNITED STATES PATENT OFFICE.

JOSHUA B. BARNES, OF FORT WAYNE, INDIANA.

VEHICLE-WHEEL TIRE.

998,668.

Specification of Letters Patent.  Patented July 25, 1911.

Application filed February 1, 1911. Serial No. 605,969.

*To all whom it may concern:*

Be it known that I, JOSHUA B. BARNES, a citizen of the United States, residing at Fort Wayne, in the county of Allen and State of Indiana, have invented a new and useful Improvement in Vehicle-Wheel Tires, of which the following is a specification.

My invention relates to a vehicle wheel tire particularly adapted for pleasure vehicles, such as buggies, automobiles, motor-cycles, bicycles and the like, and the object of my invention is to provide a highly resilient tire of the non-inflatable variety, and which tire has all of the desirable features of a pneumatic tire, and without the undesirable features of said tires, such as collapsing due to punctures or blowouts.

Figure 1:
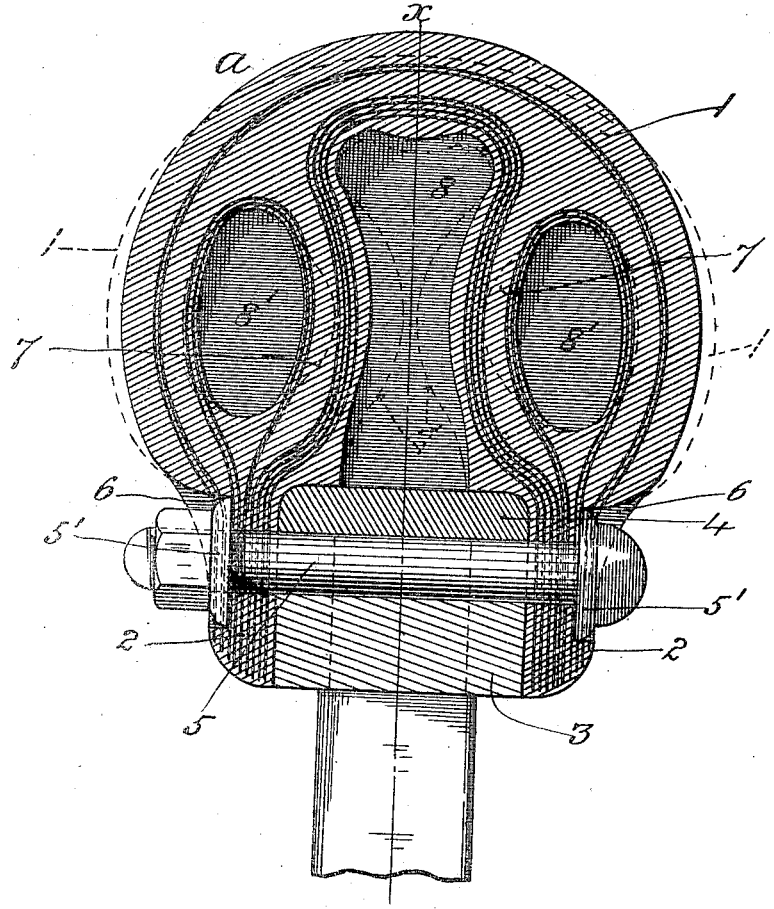
Figure 2:
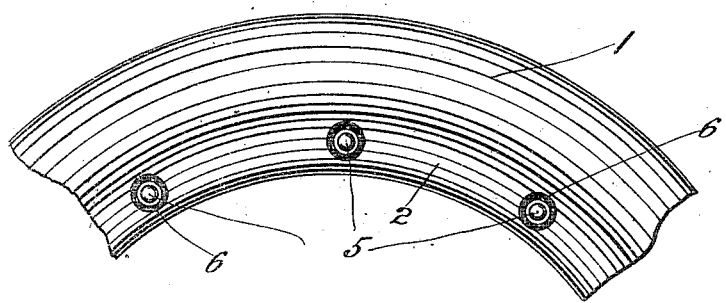

It consists in features of novelty as hereinafter described and claimed, reference being had to the accompanying drawing forming part of this specification, whereon, Figure 1, is a cross section through a vehicle wheel-tire constructed according to my invention and showing its attachment to the rim or felly of the wheel, and Fig. 2, a side view of the same, broken away.

Like letters and numerals of reference denote like parts in all the figures.

$a$ represents my improved wheel tire which is preferably composed of rubber combined with canvas in the usual well-known manner, or of any other suitable elastic material, and consists in the present case, of an outer tubular casing 1 of suitable thickness and preferably, circular in cross section for the principal part of its circumference on each side of the tread or central plane $x$ of the tire $a$ and wheel (not shown) to which it is applied, and thence formed at each side with a flattened portion or web 2 which overlaps and encircles the corresponding outer side of the felly 3, and edge of its surrounding metallic band 4, the tire $a$ being secured to the felly 3 preferably, by spaced apart bolts 5 which are passed horizontally through the webs 2 and intermediate felly 3 laterally thereto. In the outer faces of the webs 2 are preferably formed pockets or recesses 6 for housing the heads and nuts of the bolts 5 between which and the webs 2 at the bottoms of the pockets 6 are preferably, interposed washers 5' as seen clearly in Fig. 1.

Extending across the interior of the tubular casing 1, between its tread portion at a suitable distance on each side of the central plane $x$ of the tire $a$ and the opposite adjacent portion of the casing 1 at its junction with the corresponding web 2, is formed a connecting wall or chord 7 which is integral with, and encircles longitudinally, the interior of the casing 1, the wall 7 being preferably convex toward the central plane $x$, and its terminal portion at the said junction adapted to overlap and engage the periphery of the metallic band 4 of the felly 3, whereby the walls 7 divide the casing 1 into a series of longitudinally encircling spaces, to wit in the present case, a central space 8 and a space 8' at each side of the central space 8.

It will be noted that the outer portions of the walls 7 as well as the inner portions thereof are formed integral with the casing 1, and said inner portions are provided with abrupt shoulders which, when the tire is applied to the rim of the wheel, rest directly against the outer face of the band 4 carried by the wheel felly. Thus when the wheel is in service, the inner edges or portions of the walls 7 are supported by bearing against the unyielding band 4, and when the tread of the tire is depressed the walls 7 will yield or bend inwardly, as shown by dotted lines in Fig. 1, and the side portions of the casing, directly opposite the walls 1, will bend or yield outwardly, as shown by dotted lines in Fig. 1, and thus the resiliency resulting from the yielding of the four curved walls is obtained whenever pressure is applied to the tread surface of the tire.

By the above construction of tire, on the depression of the casing 1 at the tread $x$ into the position indicated by dotted line in Fig. 1, the pressure will be transmitted through the walls or chords 7, and thence partly through the overlapping portions of the walls 7 to the metallic band 4, and partly through the casing 1, webs 2, and bolts 5 to the felly 3 of the wheel, the walls 7 in so doing, being constrained into the position indicated by the dotted lines, with the result that, on removal of the stress at the tread $x$ in the revolution of the wheel, the resilience of the walls 7 and casing 1 will restore the tire $a$ to its normal shape without the use of compressed air or extraneous means.

What I claim as my invention and desire to secure by Letters Patent is:—

1. A vehicle wheel tire composed of elastic material and comprising a body substantially U shaped in cross section, a pair of curved walls within the body, the ends of which curved walls are united with the body of the tire at points outside the central plane of the tire and which walls are convex toward the central plane of the tire.

2. A vehicle wheel tire, composed of elastic material, and consisting of a tubular casing, a wall integral with and encircling longitudinally the interior of the said casing between opposite parts thereof on each side of the tread and central plane of the tire and wheel, the said wall being convex toward the said plane, and means for removably fixing the tire to the felly of the wheel.

JOSHUA B. BARNES.

Witnesses:
W. Y. McFARLAND,
W. A. MENGER.